United States Patent [19]

Kranz

[11] 4,387,600
[45] Jun. 14, 1983

[54] FIBEROPTIC PRESSURE GAUGE

[75] Inventor: Max L. Kranz, La Habra, Calif.

[73] Assignee: U.S.D. Corp, Santa Ana, Calif.

[21] Appl. No.: 253,361

[22] Filed: Apr. 13, 1981

[51] Int. Cl.³ .............................................. G01L 7/04
[52] U.S. Cl. ...................................... 73/714; 73/705; 73/742; 350/96.24
[58] Field of Search ................. 73/705, 714, 741, 742, 73/743, DIG. 11, 701, 293, 733, 732; 350/96.10, 96.24

[56] References Cited

FOREIGN PATENT DOCUMENTS 53-66276  6/1978  Japan ..................................... 73/732

Primary Examiner—Donald O. Woodiel
Attorney, Agent, or Firm—George F. Bethel; Patience K. Bethel

[57] ABSTRACT

The following specification discloses a fiberoptic pressure gauge suitable for use with a tank of compressed gas. In particular, the tank of compressed gas can be utilized by an industrial worker, a fireman, or a diver wherein breathing gas has been stored in a tank to allow for delivery thereof to a user. The pressure within the tank which is indicative of the supply of gas for delivery to a user's mask, is monitored by means of a bourdon tube type of movement that is connected to a shutter overlying a lighting source, such as a light emitting diode (LED). The lighting source is in optical relationship to a plurality of fiberoptic bundles that terminate at a distal end in a plurality of ends that are placed in calibrated relationship to a plurality of numbers indicative of the pressure within the tank. The bourdon tube movement serves to move the shutter overlying the light source to increase or decrease the light as the case may be, to light a greater or lesser number of bundles which correspond to a greater or lesser amount of pressure within the tank, as indicated on the readout. The entire system is lit by a battery and electrical connection connected to the LED's which are connected by means of a switch means that can be located at the readout or any other location for intermittent lighting operation. The pressure gauge can also be used to monitor all types of fluid pressures in gases and liquids, such as in fluid storage tanks and gas generating equipment for the production of industrial and medical gases.

22 Claims, 14 Drawing Figures

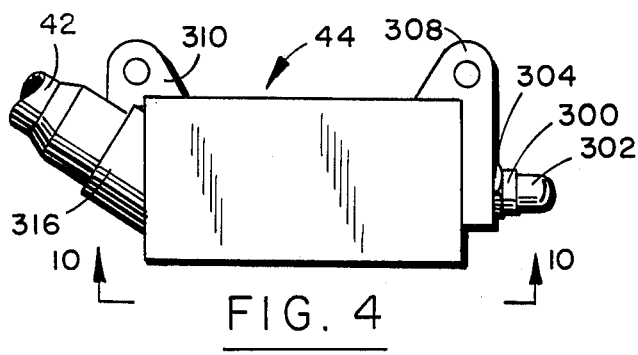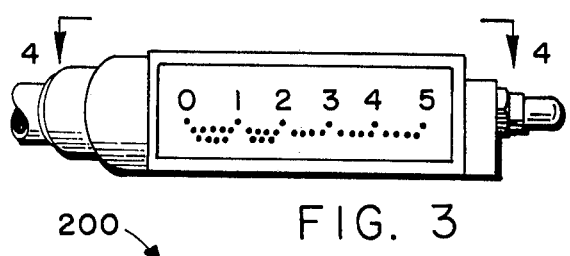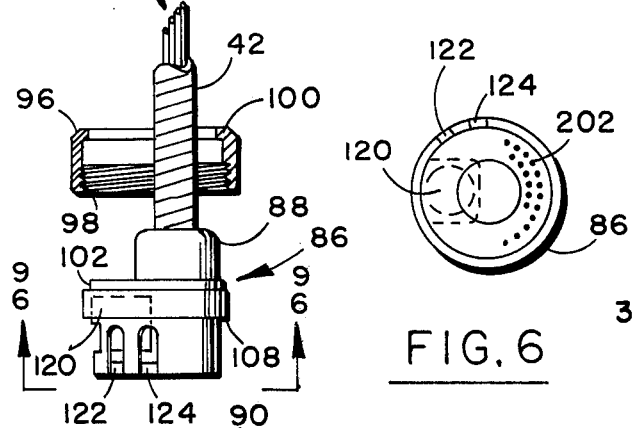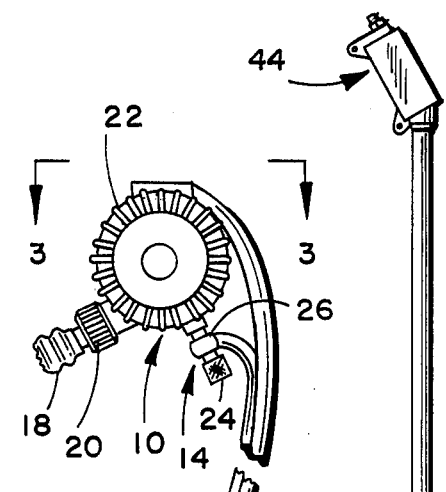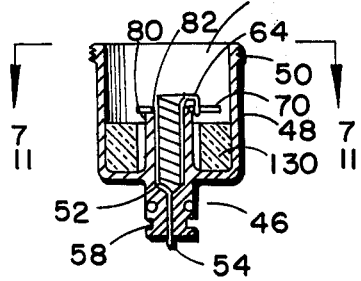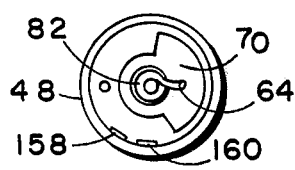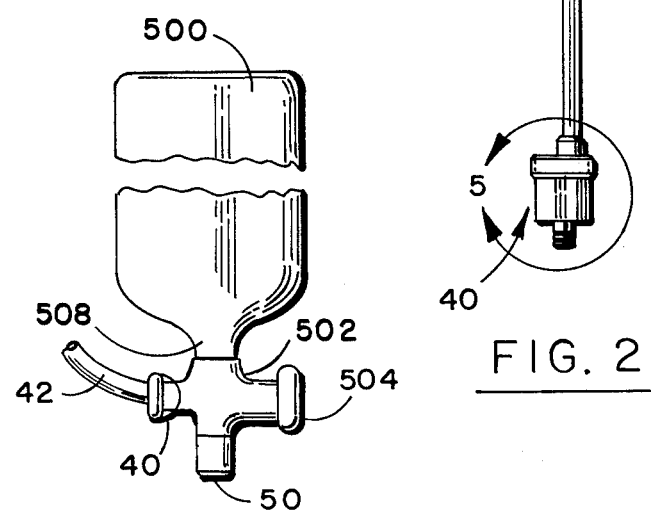

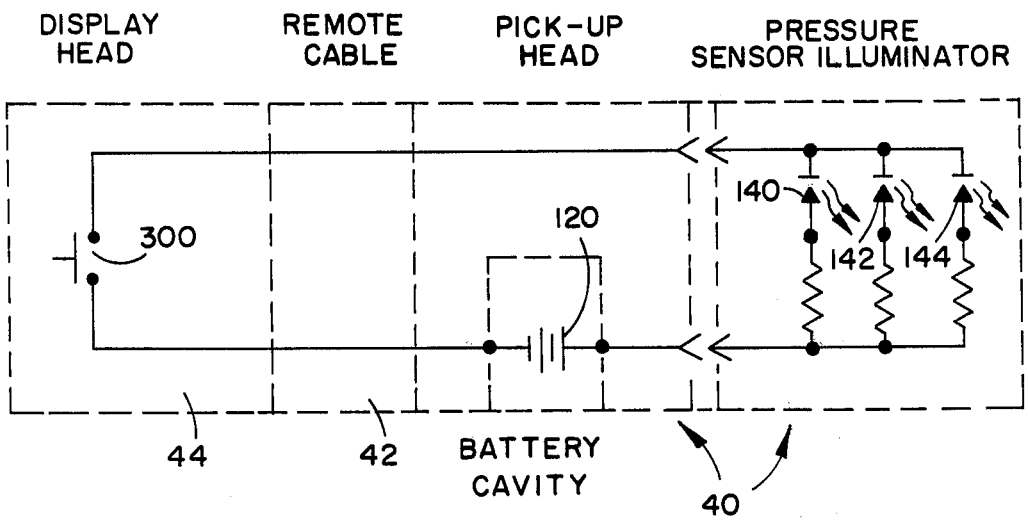
FIG. 8
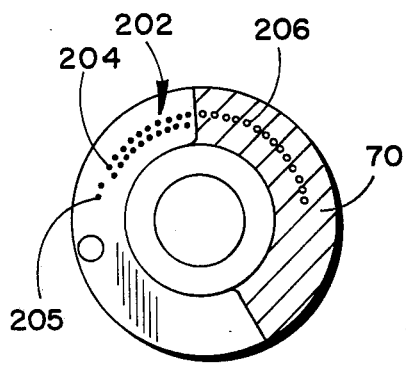
FIG. 9
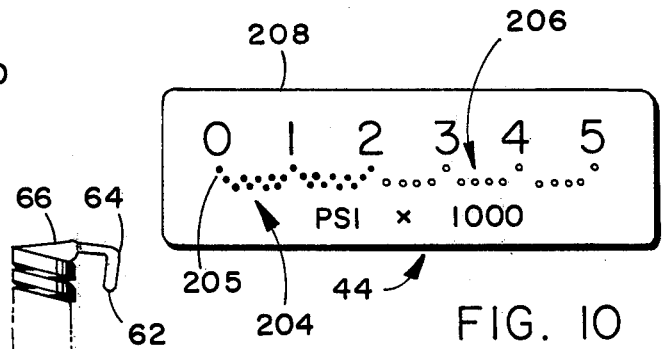
FIG. 10
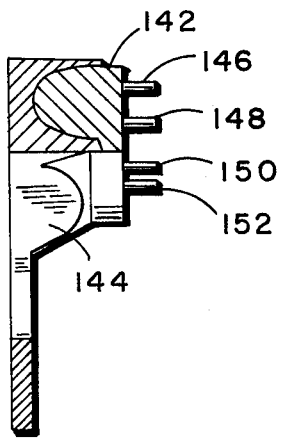
FIG. 12
FIG. 13
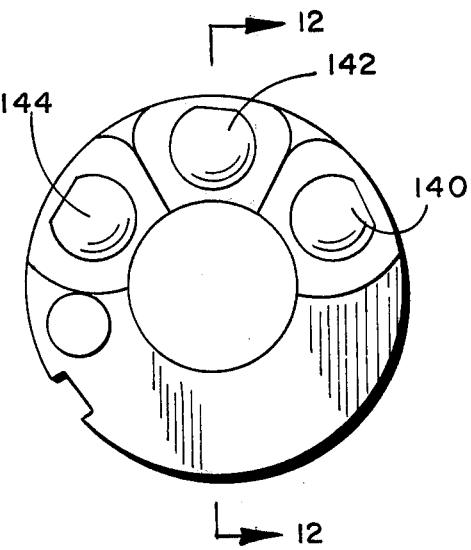
FIG. 11

FIBEROPTIC PRESSURE GAUGE

BACKGROUND OF THE INVENTION

1. Field of the Invention

The field of this invention lies within the gauge readout art. Such gauge readout art resides within pressure, depth and other gauges, wherein a certain pressure is transduced by mechanical movement means to provide an analog or digital readout to the user. In particular, this pressure readout means can be utilized for a diver's, firemen's or industrial worker's breathing gas tank to monitor the amount of pressure therein and the corresponding amount of gas for breathing purposes. It can also be used to monitor industrial fluid pressures, such as those encountered in the industrial and medical arts. Specifically, the pressure gauge readout is within the field of transducing a bourdon tube reading to provide an optical readout at a remote location through an electrical lighting means.

2. The Prior Art

The prior art as it relates to this invention, encompasses the utilization of various devices for transducing and/or conducting a pressure readout from a tank of gas or fluid. for instance, a tank of breathing gas is usually carried on one's back such as on a backpack. The tank of breathing gas usually incorporates a connection port having a yoke or connecting collar. The yoke or connecting collar is connected to a first stage regulator that generally reduces the pressure of the gas in the tank to a lower pressure. The gas when it is reduced to a lower pressure is then conducted by means of a tube to a second stage regulator which is utilized for demand breathing when a fireman, diver, or industrial worker breathes.

In effect, the second stage regulator or demand regulator operates to sense negative pressure upon inhalation, thereby valving the lower pressure as reduced from the first stage for breathing by a user through the second stage.

In order to monitor the pressure within the tank, it has been customary to specifically provide for a high pressure port at the tank connection means. This high pressure port generally had a line or conduit connected thereto in the form of a rubber hose or line. The rubber line terminated at a gauge means.

Generally, the gauge means was in the form of a bourdon tube type of gauge. In such bourdon tube type of gauges, a helical or arcuate tube was connected to the pressure within the line. The pressure expanded the gauge upon high pressure and caused it to collapse on lower pressures. The foregoing increase and decrease or concomitant movement of the bourdon tube was directly linked to a linkage which caused a dial to move in an analog manner to the amount of pressure within the tank.

It was found that the foregoing gauges, although sometimes sufficiently accurate, were not as accurate as they might very well have been, due to linkage problems with regard to the dial movement. More importantly, the utilization of a high pressure line from the high pressure port to a firemen's, industrial worker's, or diver's bodily area, created a dangerous situation if the line should break.

In particular, if a line broke, the high pressure would cause the line to move violently and possibly flagellate the user, or for that matter, cause the pressure gauge at the end to move so violently that it could dangerously beat the user.

In addition to the foregoing, the prior art did not provide for a suitable digital readout. The analog readout was such that it did not accommodate the user with appropriate information. Some types of readouts were not comprehensible, due to parallax problems and other orientations of the user with regard to the gauge and dial movement.

This particular invention overcomes many of the deficiencies of the prior art, as well as adding new features which are completely novel within the breathing gas readout and gauge art.

A major improvement of the invention is that it removes the danger of a high pressure line coming from the tank adjacent to a diver and terminating in a heavy object, such as a gauge, which can violently move and injure a diver upon breakage. The invention fundamentally places all the high pressure for introduction to the line and the fitting or connection directly on the tank. The fitting or connection, of course, is made of a metallic valve and connection structure that is superior to any rubber hose that it is connected to. Furthermore, the line or readout for the diver connected to the high pressure port, is a line that has absolutely no air pressure in it, but rather merely transmits a given optical signal.

In addition to the foregoing elimination of the high pressure line, the bourdon tube readout is in direct placement to the zone of high pressure. This was not available in the prior art. The zone of high pressure directly oriented with the bourdon tube, provides for a particular output that is directly analogous to the tank pressure, since it is connected directly thereto and not at a remote location through a line.

The bourdon tube is connected to a shutter which overlies a lighting means. The lighting means is in the form of light emitting diodes which are powered by a battery. The power requirements are extremely small in consideration of the overall effect. Overlying the shutter are a multiplicity of fiberoptic bundles that are arrayed in analogous relationship to the shutter movement. The shutter movement moves in direct correspondence to the bourdon tube to which it is connected, so as to overlie or move away from the lighting source that corresponds to low or high pressures.

The shutter movement which causes an increase or decrease in light, directly causes such amounts of light to be transmitted to each respective fiberoptic bundle which terminates in a readout.

The readout is provided with a plurality of terminal points for each fiberoptic bundle directly analogous to the amount of pressure in the tank. The pressure is calibrated by means of numbers on the readout end which correspond with the amount of pressure within the tank. This accordingly provides for a particular readout that is an analog of the pressure in the form of a lighted readout that can either be shown as numbers or a bar graph representative of the pressure in side by side relationship to the numeric display.

Accordingly, the pressure gauge of this invention is a dramatic improvement over the prior art through its elimination of the high pressure line. Furthermore, it provides for a direct readout of the bourdon tube in proximate relationship to the tank itself, as directly connected to the tank pressure.

The foregoing pressure causes a shutter movement of a shutter overlying a series of LED's which cause a light to be transmitted to a plurality of fiberoptic bundles in a greater or lesser amount, depending upon pressure. This light is then transmitted through an array of fiberoptic bundles to a line without any electrical connection, or any other type of requirement for transmitting the pressure to a pressure readout head.

In addition to the foregoing aspects, it should be understood that oftentimes high pressure areas, such as in an industrial operation, utilize gases and liquids wherein pressure has to be monitored. Monitoring such pressures either requires an electrical connection if the pressure is to be monitored in a remote location, or the pressure gauge itself must be in direct proximate location to the fluid pressure to be monitored.

It can be understood that when such high pressures are monitored in proximate relationship to the high pressure, that a dangerous situation exists for an industrial worker. Additionally, oftentimes, ambient conditions such as temperature and contaminants in industrial and nuclear processes do not provide the luxury of being able to monitor the output in direct proximate relationship to where the fluid pressure is.

This problem exists for industrial gas production, the storage of industrial gases, industrial fluid uses, whether they be hydraulic or other fluids, as well as different areas where dangerous conditions can exist for an industrial worker. Accordingly, this invention overcomes the foregoing problems by allowing the output movement of a bourdon tube to be directly transmitted by fiberoptic output to a remote location.

The pressure readout head is comprised of the fiberoptic bundles terminating in a light readout means in the form of a bar graph or a plurality of numbers lit in correspondence thereto. As a consequence, the entire device is a substantial improvement over the prior art and unique as to transmitting fluid pressure readings.

SUMMARY OF THE INVENTION

In summation, this invention comprises a high pressure bourdon tube actuated readout that transduces its movement into a light signal which is transmitted by fiberoptics to a remote location for utilization in the form of a readout by a user.

More particularly, the invention incorporates a bourdon tube connection for interconnecting to the interior of a high pressure tank of gas, such as breathing gas. The bourdon tube connection is provided with a bourdon tube which is attached to a movable shutter. The bourdon tube actuates to expand or contract upon variable pressures within the tank or other fluid pressure and accordingly moves the shutter.

Underneath the shutter are a number of LED's or light sources which can be shuttered by the movement of the bourdon tube driving the shutter. In proximate relationship to the light source, and overlying the shutter so that the shutter is placed therebetween, are an array of fiberoptic bundles. The fiberoptic bundles are within a housing that also serves to house a battery pack.

As the shutter moves over the light source, it increases or decreases the amount of light to increments of the fiberoptic bundles.

The fiberoptic bundles are conducted through a flexible tube to a readout means at a remote location that terminates the fiberoptic bundles in a series of readings that can be in the form of a bar graph or numbers that correspond to the respective pressures in the tank or fluid pressure. The number of fiberoptic bundles lit directly correlate as to the numbers at the other end or readout end of the fiberoptic bundles that are shuttered or allowed to be exposed to the light.

Accordingly, a combination pressure gauge and fiberoptic transmission to a remote location is incorporated for a user and is a substantial step over the prior art as to pressure gauge movements and readouts.

BRIEF DESCRIPTION OF THE DRAWINGS

The invention will be more clearly understood by reference to the description below taken in conjunction with the accompanying drawings wherein:

FIG. 1 shows a general view of a second stage regulator, a coupling means for connection to the breathing unit for the second stage regulator, as well as the invention of this device attached thereto;

FIG. 2 shows the bourdon tube unit and the readout head shown in FIG. 1 in a plan view as set aside from the regulator and connection means to the tank of breathing gas;

FIG. 3 shows a top plan view looking downwardly at the readout head of the pressure gauge in the direction of lines 3—3 of FIG. 1;

FIG. 4 shows the side of the pressure gauge looking in the direction of lines 4—4 of FIG. 3;

FIG. 5 shows a midline sectional view of the sensing head of this invention as taken from the portion encircled by circle 5 of FIG. 2;

FIG. 6 shows a plan view looking upwardly at the connection head in the direction of lines 6—6 of FIG. 5;

FIG. 7 is a plan view looking downwardly at the center and light means of the sensing head in the direction of lines 7—7 of FIG. 5;

FIG. 8 shows a schematic representation of the electrical circuitry of the invention;

FIG. 9 shows a diagramatic representation looking in the direction of lines 9—9 which shows how the shutter serves to cover up certain openings of the fiberoptic bundles connected to the readout;

FIG. 10 shows a view of the display of the readout head corresponding to lines 10—10 of FIG. 4 which has its reading corresponding to the shutter position shown in FIG. 9;

FIG. 11 shows a plan view looking downwardly in the direction of lines 11—11 in the direction of FIG. 5 without the shutter in place thereover;

FIG. 12 shows a sectional view through the LED array and board to which it is mounted in the direction of lines 12—12 of FIG. 11;

FIG. 13 shows a view of the bourdon tube which turns the shutter and which is connected to the high pressure connection of the breathing gas tank; and, FIG. 14 shows the invention as it would be used for monitoring a source of industrial fluid pressure, such as an industrial gas which has been stored.

DESCRIPTION OF THE PREFERRED EMBODIMENTS

Looking more specifically at the figures as they relate to the showings and as derived from FIG. 1, it can be seen that a second stage regulator 10 has been shown connected to a tube 12 at a fitting 14 for providing breathing gas to a user. The second stage regulator 10 has a hose 18 connected to its output. The hose 18 is in turn connected to a breathing mask that can cover a portion or all of a user's face. The breathing hose is connected in turn by means of a coupling 20 to the second stage regulator 10. The second stage regulator 10 has an outside notched circumferential valve handle 22 for purposes of operating the regulator which will not be detailed herein. The connection 14 can be formed by means of certain connection means, including a knurled ring 24 and a T-connection 26.

The hose 12 is connected to a first stage regulator 30 that in turn has an alarm 32 connected thereto for apprising a user of when low pressure is seen at the inlet of the regulator 30, which of course corresponds to low pressure within the breathing gas tank to which it is connected.

The regulator 30 is in turn connected to a high pressure fitting 36 which can be connected to a tank which has not been shown, by means of a yoke or other means. The high pressure fitting 36 has a high pressure port which extends outwardly through a conduit within the end of the "L" 38. The high pressure port can comprise an opening through which the pressure of the tank is seen and can be flanged, fitted, threaded or otherwise formed for receipt of a sensing head 40 which shall be described hereinafter in the other drawing figures.

Suffice it to say, the sensing head 40 is such that it is in direct pressure relationship with the pressure of the breathing gas tank and can thereby sense variances in pressure. To this end, the variances in pressure correspond to the amount of gas that is left in the tank and accordingly a reading thereof is desired by a user to determine how long one can stay in a hostile environment.

The sensing head 40 is shown connected to a flexible tube 42 which can be wrapped with a flexible helical metal cover. The flexible tube 42 is in turn connected to a readout head 44. The readout head 44 is the means for determining the pressure by means of one who is using the readout and breathing gas, as will be described hereinafter.

The sensing head 40 comprises a base high pressure fitting 46 which seats within the high pressure port outlet 38. The fitting 46 is formed as part of a housing 48 with threads 50 at the circumferential edge thereof. The fitting 46 has an O-ring 52 circumscribing a necked-down connection for sealing the fitting 46 within the high pressure conduit. The high pressure conduit means 46 has a passage 54 which receives the open end 58 of a bourdon tube.

The bourdon tube 58 extends along its length as seen in FIG. 13 through a number of helical coils 60 and terminates in a closed end 62 formed as a downward depending member or radial arm 64 extending outwardly from the last coil 66. The downwardly depending portion 64 as can be seen, is connected to a shutter 70 through an opening thereof. The shutter 70 as will be described hereinafter increases or decreases the amount of light from a light source that will be expanded upon hereinafter.

The shutter is allowed to turn on a support column bearing or post provided by an interior tubular member 80 and is locked in place by means of a clamp or locking ring 82. However, the shutter 70 can be journalled or supported by any bearing surface, so long as it is allowed to turn rotationally when the bourdon tube expands or contracts. This turns the depending portion or arm 64 around in a manner corresponding to increases or decreases in pressure sensed at the open end 54 of the bourdon tube.

The sensing head 40 has an upper portion or cap 86 that is connected to the flexible cable 42. The upper portion or cap 86 is shown connected by means of a ring 88. The upper portion 86 is seated within an opening 90 of the lower housing body 48 and provides for electrical power to the lighting source as will be described hereinafter. The upper cap portion 86 is connected to the housing 48 by means of the threaded ring member 96 having threads 98 that match the threads 50 of the lower housing 48. The ring member 96 has an interior lip 100 that seats downwardly against the upper cap portion on a ledge 102 so as to seat it tightly into the lower housing 48. In order to complete a seal, an O ring can be provided at the ledge 108.

Within the upper head 86 a battery 120 is implaced that is in turn connected to two terminals 122 and 124. The two terminals allow for power to be delivered to the lighting source that will be detailed hereinafter.

The lighting source as above referred to is within a plastic optically clear portion 130. The optically clear plastic portion can be made of a polycarbonate or any other material to provide for the lighting source to issue forth.

Looking more particularly at FIGS. 11 and 12, it can be seen that three LED's 140, 142 and 144 have been shown. These LED's are electrically connected to a series of terminals such as 146 and 148, for LED 142 and terminals 150 and 152 for LED 144. The terminals are connected to a circuitboard which in turn is connected to a pair of terminal contactors 158 and 160 in the body of the base housing 48. These terminal contactors 158 and 160 allow for power to be received from terminals 122 and 124 in the upper cap 86 to light LED's 140 through 144.

Accordingly, the battery 120 can cause the lights or LED's 140 through 144 to be lit by the connections 158 and 160.

The operation of the LED's 140 through 144 can be on a constant basis so that they are lit consistently, or they can be such that they are only lit intermittently when a readout is required. Regardless of how the readout functions, a minimum amount of battery power is required to operate the LED's 140, 142 and 144. Consequently, there is little power required to determine the output or the pressure in the breathing gas tank.

The fiberoptic readout provided by this invention is enhanced by a number of fiberoptic bundles 200 and are seen projecting from the end of cable 42. These fiberoptic bundles are seated initially within the cap portion or cover 86 of the sensing head 40, as can be generally seen in FIG. 6 with regard to the array of various fiberoptic bundles 202 therein.

The fiberoptic bundles 202 are seen more dramatically in FIG. 9 wherein a plurality of fiberoptic bundles 202 have been shown as exposed and lit bundles 204.

A plurality of the bundles 206 are shown with the shutter 70 overlying the bundles so that no light is presented from the LED's 140 through 144 for passage through the bundles 206.

The fiberoptic bundles 206 are shown terminating at the readout head 44. The readout head 44 has a plate 208 in which the fiberoptic bundles 202 terminate. Bundles 204 are shown as lit, and bundles 206 are shown as unlit. The bundles fundamentally correspond to increments in the pressure so that the readout head 44 shown in FIG. 10 corresponding to the lighted portion of the bundles 204 registers two thousand psi on the scale.

As an alternative to the foregoing, the readout head 44 with the face plate 208 can be made with the numbers zero through five, formed as terminal ends of the fiberoptic bundles 202 so that the numbers themselves are lit, rather than an analogous bar graph or segment shown as in FIG. 10. This thereby creates an analog to digital converter in an optical sense of the word for a pressure gauge which is novel over the prior art.

FIG. 10 shows an incremental number of the fiberoptic bundles 204 that terminate therein and correspond to increments of one hundred psi as to each particular dot in the array. In this manner, one can look down and not only see the general bar graph representation, but also a discrete readout, depending upon the number of dots that indicate the hundreds, as well as the one thousand increments of psi within the tank. Accordingly, the readout of the bundles 204 as seen can correspond directly to minor increments as shown by the scale between the numbers. To enhance this, the scale is such that each increment is offset in the lower numbered region of the lit bundles 204 in order to provide for differences in reading ability of the particular fiberoptic bundles.

The electrical elements of the system can be seen in FIG. 8 wherein the readout head or display head 44 is shown with a switch 300. The switch 300 is in effect a pushbutton switch shown in FIG. 4 with a small button 302 seated within a nut 304. The switch is connected across the terminals of the LED's 140 and 144 to allow them to be lit intermittently for providing a readout only when desired.

The entire readout head 44 is attached by means of ears 308 and 310 having openings therein for screwing the head 44 to the second stage regulator 10.

The fiberoptic bundles within the flexible tube 42 can terminate at the angular sleeve 316 shown in FIG. 4.

For purposes of explanation, it should be understood that the entire device can be made with any kind of fiberoptic members such as plastic and glass tubes, strands, and filaments for transmitting light from the LED's that have been shuttered by the shutter 70 to indicate an appropriate number of spaces or digits analogous thereto. Furthermore, any light source can be utilized other than LED's and any power source other than the battery powered source as indicated. Additionally, the device can be such that it functions with a readout that is either remote or that is in direct juxtaposition to the head. Thus, it is not necessary to specifically have the readout at the extended distance as is shown. However, it is thought that the readout specifically at the distance shown is more usable and finds a greater degree of practicality.

Looking more particularly at FIG. 14, it can be seen that an industrial gas tank 500 that has been fragmented, is shown connected to a valving head 502 having valve means 504 and an output 506 connected at the neck 508.

The pressure sensing head 40 of this invention has been shown connected to the head 502 and includes the line 42. The bourdon tube therein is in direct pressure relationship to the pressure in the tank 500.

The foregoing industrial pressurized tanks 500 which are used oftentimes for storing industrial gas in large quantities or connected to other tanks by a manifold connected thereto, have been monitored by pressure gauges generally in proximate relationship to the tank. However, oftentimes, in medical, industrial and other uses, it is not possible to have such a close monitoring of the gas, due to either dangerous circumstances, or environments and ambient temperatures which are not suitable for close monitoring. Also, oftentimes, proximate locations of the tanks are not such that they can be easily monitored by looking at each one respectively.

Furthermore, as can be apprepricate in industrial applications, when high pressure fluids and gases are utilized, it is often necessary to have a bourdon tube pressure gauge reading to monitor the industrial process. When such bourdon tube pressure gauge readings are taken, with one in proximate relationship to the process. it can be dangerous if the ambient conditions are not fit for human exposure or there is a danger of explosion or high pressures in the surrounding environment.

This invention provides a remote monitoring of gas and fluids, such as in the industrial gas tank 500, as well as in oxygen generation and other industrial gas uses, and industrial processes using pressurized fluids.

Accordingly, this invention operates by means of the bourdon tube which is connected to the high pressure of the tank, moving in a helical direction, so that the downwardly depending arm 64 rotates with respect to the axis of the bourdon tube. Thus, movement causes the shutter 70 to be implaced over the light emitting diodes 140 through 144 to some degree or the other. When there is no pressure, the shutter 70 overlies the light emitting diodes so that no light is cast on the fiberoptic bundles 202, except bundles 205. In this manner, no lit bundles such as those lit bundles 204 have any light cast thereupon so that all the bundles 202 except 205 are covered, in the manner of bundles 206, thereby creating no light output, such as from bundles 204.

By way of explanation, the bourdon tube when there is no pressure applied to its interior, causes the arm 64 to be completely turned by its resilience to a position wherein the shutter 70 overlies all the optical bundles 202, thereby eliminating any light passing into the bundles so that there is no pressure readout at the face plate 208. Of course, when full pressure of five thousand psi is sensed in the bourdon tube, arm 64 will move the shutter 70 completely from the light source, so that the bundles 206 are no longer covered, thereby causing a reading directly of the full scale from zero to five thousand psi with each bundle lit. Of course, as the pressure decreases, the shutter 70 moves incrementally in response to the movement of arm 64 due to the decreased pressure in the bourdon tube causing the arm 64 to rotate backwardly based upon the resilience of the bourdon tube. This accordingly creates an analogous condition where the readout on the bundles 202 corresponds until zero pressure is sensed, at which time the last bundle 205 on the face 208 is the only one that remains lit showing a zero pressure within the tank.

From the forgoing, it can be seen that this invention is a substantial step forward over the prior art as to providing a pressure sensor head that can transmit an optical analog signal which can be read or converted at a readout head from an analog to a digital readout. The invention eliminates many problems of the prior art and creates a readout which is usable and effective for those using high pressure sources of fluids. Accordingly, it should be construed broadly in light of the following claims, as set forth hereinafter.

I claim:

1. A pressure gauge readout for sensing pressures within a body of breathing gas contained within a tank and displaying them comprising:
    a pressure gauge readout head having a fitting thereon with an opening adapted for receipt of pressure from a tank of breathing gas;
    a bourdon tube having an open end adapted for contact with the opening of said pressure head connection for receipt of pressure within said breathing gas tank;

light means within said pressure sensing head;

means attached to said bourdon tube for controlling the location of light emitted from said light means so that as said bourdon tube moves, said means for controlling the light location will correspond to said bourdon tube movement and analogous pressure within said breathing gas tank;

a plurality of discrete light conducting means in optical relationship to said light means for conducting light therefrom corresponding to the controlled location provided by said light controlling means; and, means attached to said light conducting means for indicating the amount of pressure corresponding to the location of light conducted therethrough.

2. The readout as claimed in claim 1 further comprising:

light conducting means formed as fiberoptic strands.

3. The readout as claimed in claim 2 further comprising:

a readout head having terminal points of said fiberoptic members wherein said fiberoptic terminal points correspond in relationship to pressures within said breathing gas tank.

4. The readout as claimed in claim 3 further comprising:

a shutter forming said light controlling means in said pressure head.

5. The readout as claimed in claim 4 further comprising:

battery means for lighting said light means within said pressure sensing head.

6. The readout as claimed in claim 5 further comprising:

switch means for lighting said light means by said battery when a readout is desired from said pressure display head.

7. The readout as claimed in claim 6 wherein said light source comprises:

light emitting diodes.

8. The readout as claimed in claim 1 wherein:

said pressure sensing head is adapted for connection to a high pressure fitting of a firemens' breathing apparatus.

9. The readout as claimed in claim 1 wherein:

said light conducting means comprise a plurality of fiberoptic members arrayed in overlying relationship to said light means; and, said light controlling means comprises a movable shutter that interferes with the passage of light to said light conducting fiber means corresponding to the amount of pressure in said breathing gas tank.

10. The combination of a breathing gas system having a tank, regulator means, and a mask connected thereto and an improved pressure gauge wherein the improvement comprises:

a housing having a bourdon tube for connected relationship to high pressure within a breathing gas tank to allow it to move corresponding to pressure in the tank;

a light source within said housing;

a discrete plurality of conducting means overlying said light source; and, means connected to said bourdon tube for interrupting said light source in response to the movement of said bourdon tube as said light source is exposed to said discrete plurality of light conducting means so that said interrupting means interrupting said light causes the interruption to correspond to the amount of movement of said bourdon tube which corresponds to the pressure within said breathing gas tank, thereby incrementally exposing said discrete plurality of light conducting means to provide for a readout from each discrete member of said plurality.

11. The combination as claimed in claim 10 wherein said light conducting means comprise:

fiberoptic strands.

12. The combination as claimed in claim 10 further comprising:

a readout head distal from said housing holding said light interference means and said light means wherein said readout means has an indicia of pressure that is lit corresponding to the amount of pressure in said tank which corresponds to the amount of light interference by said light interfering means within said housing.

13. The combination as claimed in claim 12 further comprising:

switch means for actuating said lighting means on an intermittent basis whenever a reading is desired.

14. The combination as claimed in claim 13 wherein:

said light interfering means comprises a shutter which moves in a rotational manner over said light means.

15. The combination as claimed in claim 14 wherein said light means comprise:

light emitting diodes.

16. The combination as claimed in claim 15 comprising:

a bourdon tube having a helical configuration with an arm extending therefrom which is connected to said shutter to move it around the bourdon tube in a rotational manner corresponding to the pressure sensed within the bourdon tube.

17. The combination as claimed in claim 16 wherein said readout means comprises:

an array of fiberoptical members within said readout head placed in an elongated display indicating the pressure corresponding to the pressure within said breathing gas tank.

18. A pressure readout device for transmitting the movement of a bourdon tube in response to fluid pressures within a tank of breathing gas comprising:

light means;

shutter means for interfering with said light means connected to said bourdon tube for movement corresponding to pressure therein so that said light means is correspondingly interfered with depending upon the movement of said shutter means that moves with respect to said bourdon tube;

a plurality of discrete light transmitting means overlying said shutter means for transmitting the light emitted from said light means based upon the position of said shutter with respect to each of said discrete light transmitting means; and, a pressure readout head in connected relationship to said light conducting means for displaying light at the ends of each of said plurality of discrete light transmitting means corresponding to the amount of fluid pressure.

19. The device as claimed in claim 18 wherein:

said light means comprises light emitting diodes.

20. The device as claimed in claim 19 wherein said light conducting means comprise:

fiberoptic bundles.

21. The device as claimed in claim 20 wherein:
said fiberoptic members terminate in the form of numbers corresponding to the pressure in said breathing gas tank so that the analogous pressures are transmitted and converted into a digital readout.

22. The pressure readout device as claimed in claim 21 wherein:
said fiberoptic members are arrayed around said bourdon tube movement; and,
said bourdon tube is a helical bourdon tube having an arm connected to said shutter means so that said shutter means can move around said bourdon tube, thereby interfering with the light source as it casts on said fiberoptic members around said bourdon tube.

* * * * *